(No Model.)
J. RASCHEN.
PROCESS OF MAKING CYANIDS.
No. 567,552.   Patented Sept. 8, 1896.
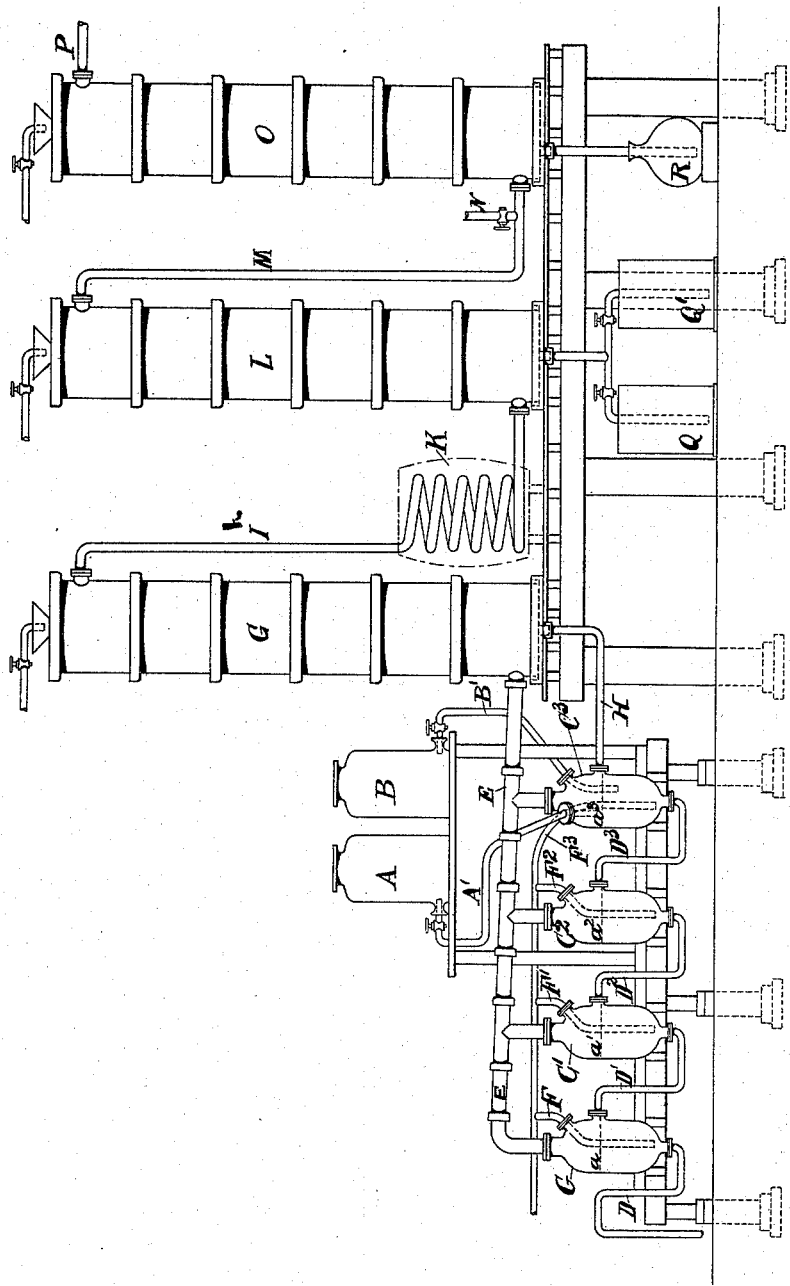

UNITED STATES PATENT OFFICE.

JULIUS RASCHEN, OF LIVERPOOL, ENGLAND, ASSIGNOR TO THE UNITED ALKALI COMPANY, LIMITED, OF SAME PLACE.

PROCESS OF MAKING CYANIDS.

SPECIFICATION forming part of Letters Patent No. 567,552, dated September 8, 1896.

Application filed December 23, 1895. Serial No. 573,154. (No specimens.)

*To all whom it may concern:*

Be it known that I, JULIUS RASCHEN, Ph.D., analytical chemist, a subject of the Queen of Great Britain and Ireland, residing at G 11 Exchange Buildings, Liverpool, in the county of Lancaster, England, have invented certain Improvements in the Manufacture of Cyanids and Ferrocyanids from Sulfocyanids and in the Recovery of By-Products, of which the following is a specification.

The manufacture of cyanids and ferrocyanids as hitherto practiced has always been attended with great difficulties, and has involved losses of cyanid from various well-known causes. The removal of the sulfur from the sulfocyanid has usually been attempted by heating the sulfocyanid either with a metal, such as iron, zinc, or lead, or with a mixture of an alkaline earth and carbon. These processes demand a high temperature, are costly, and give unsatisfactory results.

In the specification of my application for Letters Patent, Serial No. 573,153, dated December 23, 1895, I describe the separation of the sulfur contained in the sulfocyanid by treating such sulfocyanid, dissolved in water, (or in case the sulfocyanid should be an insoluble one, then suspended in water,) by means of an oxidizing agent, such as nitric acid, which converts the sulfur in the sulfocyanid into sulfuric acid and at the same time liberates the cyanogen in the form of hydrocyanic acid; or I use as the oxidizing agent a nitrate, chromate, lead peroxid, manganese peroxid or the like, together with an acid, such as sulfuric acid, but as the economical manufacture depends on the recovery of the oxidizing agent, and this is most readily accomplished when nitric acid is used as the oxidixing agent, I prefer to employ nitric acid, as stated in the aforesaid specification. The main reaction which takes place when a sulfocyanid is thus treated with nitric acid may be represented by the following equation, choosing sodium sulfocyanid as an example:

$$NaCNS + 2HNO_3 = HCN + 2NO + NaHSO_4.$$

This present invention has for its object to effect improvements in the process as hereinafter described, and may be carried out as follows: I mix a sulfocyanid, such as sodium or calcium sulfocyanid, with about four to five times its weight of water and allow this mixture to flow gradually into a closed vessel or "still" containing some water or mother liquor from a previous operation, which I maintain at or near its boiling-point, (say 96° centigrade,) the said vessel being also provided, preferably, with a stirrer or agitator. Simultaneously I admit nitric acid, or a solution of nitrate of soda mixed with sulfuric acid, into the vessel through a separate pipe at such a rate that there shall always be free nitric acid in the vessel. Excess of sulfocyanid should be avoided. By this operation the sulfur of the sulfocyanid is oxidized to sulfuric acid, and the cyanogen is liberated in the form of hydrocyanic acid.

During the whole operation care must be taken to exclude all air, so as to avoid oxidation of the nitric oxid, and the raw materials should be as free from chlorids as possible.

The liberated gases, vapors, and fumes, consisting of hydrocyanic acid, nitric oxid, water-vapor, and a small quantity of nitrous fumes and carbonic-acid gas, are first passed through a scrubber containing water heated to about 80° centigrade, which retains the nitrous fumes. The dilute solution of nitric acid formed by the absorption of the nitrous fumes in the scrubber may be passed through the still in order to utilize the nitric acid and to avoid the loss of any hydrocyanic acid it may contain. The mixture of hydrocyanic acid, water-vapor, nitric oxid, and carbonic acid, after cooling, if necessary, is then passed into an absorbing vessel or into absorbing vessels containing alkaline bases, as before; but in order to avoid as much as possible the contamination of the resulting cyanids with carbonates I prefer to absorb the hydrocyanic acid by whatever method it has been prepared in cold water. For this purpose I pass the gas, either directly from the still or, if nitric acid, from the scrubber, as the case may be, into a vessel or series of vessels containing cold water, or into a tower containing any suitable material presenting a large extent of surface, down which cold water is allowed to run. The cold water absorbs the hydrocyanic acid, but allows the nitric oxid and carbonic acid to pass on, and as these may contain traces of hydrocyanic acid they are passed through lime water, when the hydrocyanic and the carbonic acids are absorbed, carbonate of lime being precipitated and cyanid of calcium remaining in solution. The solution of calcium cyanid thus obtained may be treated with an alkaline carbonate to obtain the alkaline cyanid. The gas escaping from this lime scrubber now only consists of nitric oxid, which I mix with steam and air and treat in the usual way for the recovery of nitric acid.

The solution of hydrocyanic acid is neutralized with a solution of a caustic base, such as caustic soda or potash, to obtain the required cyanid, and is evaporated to dryness, or, as the nitrous fumes have been removed, can be brought to the anhydrous condition in a suitable vessel. This is advantageously done in a vacuum. The solution of alkaline cyanid may, if desired, be converted into the corresponding ferrocyanid by treatment with iron salts, as is well understood, when, by concentration and crystallization, the ferrocyanid can be obtained.

In the accompanying drawing is shown diagrammatically an arrangement of apparatus which may be employed in carrying out the invention.

A and B are stoneware vessels, the one containing nitric acid, the other the sulphocyanid, which flow through pipes $A'$ and $B'$ into the stoneware decomposer $C^3$, filled with water to the dotted line $a^3$. From $C^3$ the solution flows through $D^3$ into $C^2$, through $D^2$ into $C'$, and by $D'$ into C, and therefrom by pipe D. The level of water in these vessels is indicated by the dotted lines $a$ $a'$ $a^2$.

F $F'$ $F^2$ $F^3$ are steam-pipes with branches leading down into the vessels C to $C^3$.

The evolved gases pass through the pipe E into the scrubber G, meeting hot water supplied by the tap above to remove nitrous fumes, from which the liquor runs back through pipe H into vessel $C^3$. The gases then pass through the pipe I and through cooler K into the absorber L, in which the hydrocyanic acid is condensed by cold water supplied by the tap above and flows into receptacles Q and $Q'$, containing the caustic alkali. The remaining gases pass through the pipe M, and with air and steam admitted through pipe N pass into the nitric-acid condenser O, fed with water by the tap above, when the recovered nitric acid flows into the receiver R. The whole apparatus is kept under a slight vacuum by a vacuum-pump connected to a pipe P.

The several vessels C are used partly to avoid the use of a stirrer and partly to enable the process to be continuous.

Owing to the poisonous properties of hydrocyanic acid and of the cyanids, it is necessary to operate with great care, and it is advisable to maintain a slight vacuum in the apparatus, so that no gases may escape into the atmosphere should the apparatus become leaky, but air must be prevented from entering the apparatus.

It will, of course, be understood that where nitric acid is specified as the oxidizing agent the equivalents of that substance are included.

Having now particularly described and ascertained the nature of my said invention and in what manner the same is to be performed, I declare that what I claim is—

1. In the manufacture of cyanids, from sulfocyanids; the treatment of sulfocyanid, dissolved, or suspended, in water, with an oxidizing agent, such as nitric acid, and passing the evolved gaseous mixture through a heated water scrubber where the nitrous fumes are retained, the remaining gases and vapors being then passed into, or in contact with, cold water or other medium by which the hydrocyanic acid is absorbed for obtainment, or for subsequent obtainment, of the cyanid; substantially as hereinbefore described.

2. In the manufacture of cyanids, from sulfocyanids, the treatment of sulfocyanid, dissolved or suspended in water, with an oxidizing agent, such as nitric acid, and passing the evolved gaseous mixture through a heated water scrubber where the nitrous fumes are retained the remaining gases and vapor being then passed into, or in contact with, cold water, or other medium by which the hydrocyanic acid is absorbed for obtainment, or for subsequent obtainment, of the cyanid, the nitric oxid and carbonic acid, with traces of hydrocyanic acid, being passed through, or in contact with, lime water, to obtain cyanid, the escaping nitric oxid being then treated with steam and air for the obtainment of nitric acid; substantially as hereinbefore described.

3. In the manufacture of cyanids, from sulfocyanids; the treatment of sulfocyanid dissolved, or suspended, in water, with an oxidizing agent, such as nitric acid, and passing the evolved gaseous mixture through a heated water scrubber where the nitrous fumes are retained, the remaining gases and vapor being passed into, or in contact with cold water or other medium by which the hydrocyanic acid is absorbed for obtainment, or for subsequent obtainment of the cyanid, the escaping nitric oxid being then treated with steam and air for the obtainment of nitric acid; substantially as hereinbefore described.

In testimony whereof I have signed my name to this specification in the presence of two subscribing witnesses.

J. RASCHEN.

Witnesses:
WM. PIERCE,
WM. G. MURRAY.